Patented June 29, 1937

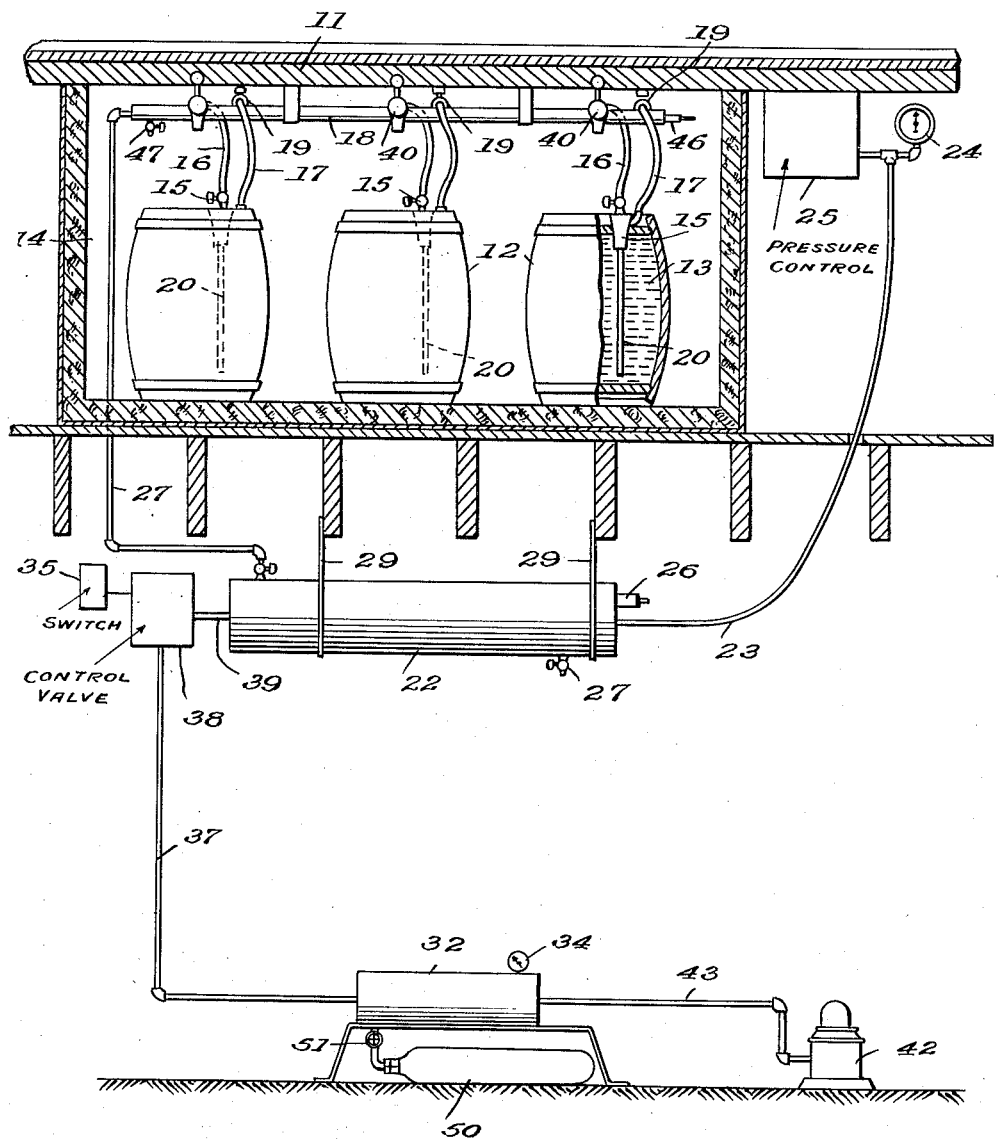

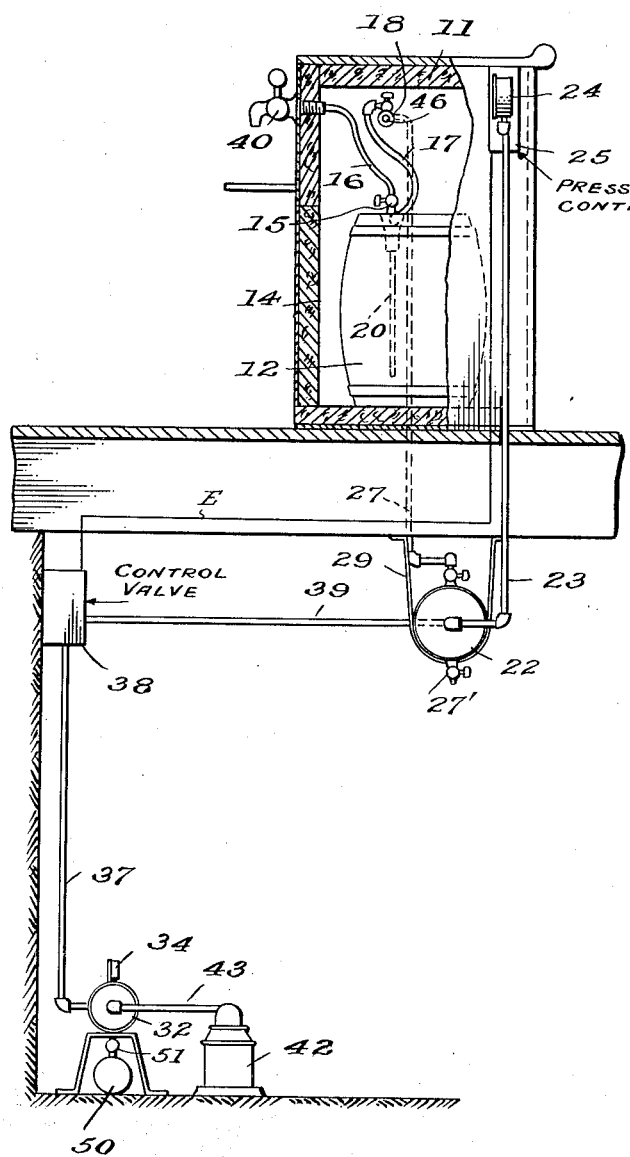
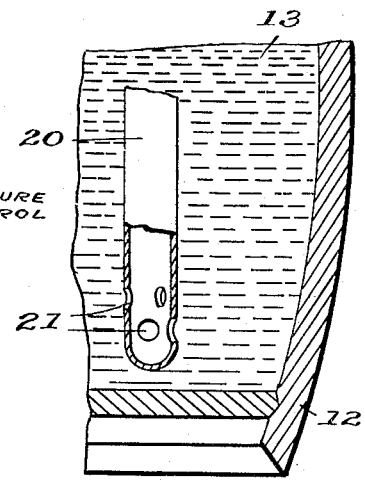

2,085,274

UNITED STATES PATENT OFFICE 2,085,274

BEVERAGE DISPENSING SYSTEM

Harry R. Rutt and George A. Rutt,
Delawanna, N. J.

Application December 28, 1935, Serial No. 56,575

1 Claim. (Cl. 225—17)

This invention relates to a dispensing system for beer and analogous beverages.

It is the object of the invention to provide a beverage dispensing system, in particular for beer or ale, which permits the drawing or draught of the beverage to be executed with ease and uniformity. Heretofore the handling of beer, particularly at its point of ultimate consumption, has presented vexing problems. It has been difficult to draw beer to meet a varying demand and still obtain a beverage having uniform characteristics. In the past only an experienced bartender could be relied upon to draw several glasses of beer and to obtain the proper proportions between the body and the head or foam of the beverage. The cooling of beer has also presented many problems. The use of coils, ranging from 50 to 150 feet in length, which have been used for cooling, constitute a costly element. Furthermore these coils have the disadvantage of requiring cleaning at close intervals. These are also responsible for wastage at the times when the draught of the beer is initiated after a long lapse of time, such as at the beginning of a day.

It is the object of our invention to overcome successfully all of the objections mentioned above. By providing a dispensing system which embodies features which constitute a radical departure from the practices in the prior art we realize the specific advantages of obtaining a uniform product, the draught of which requires no special skill, economic operation including economical and most satisfactory cooling, and substantially no wastage.

The most salient characteristic of our invention is the low pressure at which it operates. Whereas the gas pressures upon the level of the beer in the kegs or analogous containers in the past have been as high as nearly fifty pounds per square inch, and in no instance was it considered practical to dispense beer with pressures lower than eight pounds per square inch, we have found that all of the advantages enumerated above accrue by use of pressures less than eight pounds per square inch, and more specifically lower than five pounds per square inch, in a range extending around from between two and one-half to four and one-half pounds per square inch.

It is a further object of our invention to provide a system which is maintained automatically in a condition for optimum operation, requiring human intervention but seldom.

Other objects and purposes will appear from a more detailed description of one preferred embodiment of the invention taken in conjunction with the accompanying drawings wherein—

Fig. 1 is a front elevation, with certain parts in section, of the arrangement according to our invention, Fig. 2 is a side elevation, with certain parts in section, of Fig. 1, and Fig. 3 an enlarged view of a detail of Fig. 1.

In the drawings is shown a bar 11, the interior of which may consist of a cooling chamber 14 of a refrigerator, preferably of the mechanical type. A plurality of beverage containers 12, such as ordinary wooden beer kegs or drums of glass, crockery, metal or combinations of these materials, are disposed within the cooling chamber. This chamber is preferably maintained at a temperature of between 36 and 40 degrees Fahrenheit, which renders the beverage 13 most palatable upon its delivery and consumption at a slightly higher temperature.

The beer tap 15 may be fitted into the head of one or more of the containers 12, as shown in Figs. 1 and 2, and the tapper rod 20 extends downwardly therefrom into the body of the beverage to a point closely adjacent the bottom of the container. In accordance with the invention, there are provided four to six openings 21 at the lower end of the rod 20, of a diameter of about one-quarter to three-eighths of an inch, which openings offer a reduced constriction to the flow of the beer. Thereby a "wild" flowing of the beer is precluded and a lesser pressure loss is occasioned at this point. A tube 16 extends from the upper end of the tapper rod to the dispensing element or faucet 40. A flexible tube also extends from the air nipple of the beer tap 15 to one of the petcocks 19 in the header tube 18. The latter communicates with the low pressure tank 22 through the intermediary of a connecting tube 27 which serves to impose the pressure of the gaseous medium in the tank upon the surface of the beverage in the container 12. Although this pressure is below that which has been recognized in the past as the permissible lower limit, namely eight pounds per square inch, it is adequate to maintain intact the gases embodied in the beer prior to the delivery thereof while assuring such delivery smoothly and uniformly without any "wildness", eliminating any necessity for critical control or special skill in the draughting operation.

We have found that a pressure of about three and one-half pounds per square inch in the tank 22, within the variations mentioned above, results in a highly satisfactory operation. This pressure is indicated upon a pressure gauge 24 at a point in proximity to the bar 11, for observation by an attendant. Tubing 23 connects the tank 22 with the gauge 24 and in addition the tube 23 is connected with a pressure control device 25 which may actuate an electric switch at a predetermined lower limit of pressure, closing an electric circuit E which may operate a solenoid control or magnetic valve 38 to replenish the pressure in tank 22 to the proper degree, whereupon the pressure control switch is rendered inoperative. The control system may be placed in position for operation by the closing of a master switch 35, wired up in circuit with the solenoid valve 38 and the remaining circuit controlling elements.

The solenoid control valve 38 is disposed in the connections 37 and 39 between the low pressure tank 22 and a high pressure source, which in the preferred form of the invention consists of a high pressure tank 32, maintained automatically at a pressure of about fifty pounds per square inch, which is indicated upon a gauge 34. An air compressor 42 communicates with the tank 32 through a conduit 43. A compressed gas bottle 50 also communicates with the tank 32 through a valve connection 51 and serves as a reserve source of pressure. Our system operates equally well with compressed air or compressed carbonic gas. Also the high pressure tank may be dispensed with and the control valve 38 may be connected directly to the air compressor 42 and/or the gas bottle 50.

The low pressure tank 22 is provided with a safety valve 26 which may be normally set to blow off at five pounds pressure. The tank is also fitted with a blow-off valve 27'. Likewise the header tube is provided with a safety valve 46 and a blow-off valve 47.

Although we have shown the low pressure tank 22 supported upon hoops attached to the beams of the ceiling of the basement, this unit may be placed in any other convenient location. Likewise the invention contemplates the disposition of the beverage containers in a cooling chamber other than one disposed within the bar, for example in the cellar. Furthermore, the cooling effect upon the draughted beverage may be enhanced by the substitution of a cooling tube or coil of limited extent for the tubular connection 16 in the illustrated embodiment, which connection averages from one to four feet in length. Such coils may be as much as twenty to thirty feet in length and are much shorter than the lengths in conventional cooling coils in order that they not offer too great an obstruction to the travel of the beverage to the faucet 40 in view of the low pressures which are utilized.

It is understood that more than one header tube may be used in our system and that as many air connections as desired may be tapped from each of these headers. Furthermore these headers may be disposed in other locations than that shown.

While we have described our invention as embodied in concrete form and as operating in a specific manner for purposes of illustration, it should be understood that we do not limit our invention thereto, since various modifications will suggest themselves to those skilled in the art without departing from the spirit of our invention, the scope of which is set forth in the annexed claim.

Having described our invention what we claim is:

In a system for dispensing brew beverages, the combination of a bar including a refrigerating cabinet for receiving a plurality of closed beverage containers; a header supported in the upper portion of said cabinet; a gas tank connected to said header; a second gas tank; means for connecting the second mentioned tank to a source of gas under high pressure; a conduit connecting said tanks for conducting the gas from the second mentioned tank to the first mentioned tank; means for controlling the flow of gas through said conduit and materially reducing the pressure thereof and including a pressure responsive device arranged adjacent to said bar and connected to said first mentioned tank; a magnetic valve in said conduit and electric connections leading from said device to said valve; and a plurality of short tubes connected to said header and adapted to transmit the gas therefrom to the beverage containers in said cabinet.

HARRY R. RUTT.
GEORGE A. RUTT.